US 6,631,364 B1

(12) United States Patent
Rioux et al.

(10) Patent No.: US 6,631,364 B1
(45) Date of Patent: Oct. 7, 2003

(54) METHOD OF SEARCHING 3-DIMENSIONAL IMAGES

(75) Inventors: Marc Rioux, Ottawa (CA); Eric Paquet, Therford Mines (CA)

(73) Assignee: National Research Council of Canada, Ottawa (CA)

(*) Notice: Subject to any disclaimer, the term of this patent is extended or adjusted under 35 U.S.C. 154(b) by 0 days.

(21) Appl. No.: 09/469,472

(22) Filed: Dec. 22, 1999

Related U.S. Application Data

(63) Continuation-in-part of application No. 08/824,289, filed on Mar. 26, 1997, now Pat. No. 6,016,487.

(51) Int. Cl.[7] .............................................. G06F 17/30
(52) U.S. Cl. ................... 707/2; 707/103 R; 707/104.1; 382/154; 382/285
(58) Field of Search ................................ 707/2, 3, 4, 5; 382/107, 159, 190; 345/156

(56) References Cited

U.S. PATENT DOCUMENTS

| 5,381,158 | A | * | 1/1995 | Takahara et al. ............. 345/156 |
| 5,579,471 | A | * | 11/1996 | Barber et al. ................ 395/326 |
| 5,587,922 | A | * | 12/1996 | Hendrickson et al. ...... 364/489 |
| 5,644,765 | A | * | 7/1997 | Shimura et al. ............ 395/615 |
| 5,784,294 | A | | 7/1998 | Platt et al. .................. 364/496 |
| 5,805,727 | A | * | 9/1998 | Nakano ...................... 382/195 |
| 5,841,892 | A | * | 11/1998 | McGrath et al. ............ 382/141 |
| 5,896,462 | A | | 4/1999 | Stern .......................... 382/306 |
| 5,987,456 | A | * | 11/1999 | Ravela et al. .................. 707/5 |
| 6,081,273 | A | * | 6/2000 | Weng et al. ................. 345/425 |
| 6,408,321 | B1 | * | 6/2002 | Platt ........................... 708/520 |

FOREIGN PATENT DOCUMENTS

| EP | 0 516 483 A2 | 12/1992 |
| EP | 0 588 243 A1 | 3/1994 |

* cited by examiner

*Primary Examiner*—Hosain T. Alam
*Assistant Examiner*—Jacques Veillard

(57) ABSTRACT

In the past, databases containing three dimensional images were searched by keywords and indexes. For such functionality a set of keywords must be associated with each image. This is not a dynamic method and is prone to errors. It has been found that searching of three-dimensional images stored electronically can be performed in dependence upon characteristics of the image such as colour, shape, size, scale, etc. A method is disclosed for searching three dimensional images in dependence upon image characteristics.

16 Claims, 6 Drawing Sheets

METHOD OF SEARCHING 3-DIMENSIONAL IMAGES

CROSS REFERENCE TO RELATED APPLICATIONS

The present application is a continuation-in-part of U.S. Pat. application Ser. No. 08/824,289 filed on Mar. 26, 1997 now U.S. Pat. No. 6,016,487.

FIELD OF THE INVENTION

The present invention relates to a method for image-based searching and characterizing 3-Dimensional images.

BACKGROUND OF THE INVENTION

In the past, the searching of images has been performed by searching text information associated with a particular image. However, keyword searching for images is no longer adequate, especially in the global community of the Internet. The keywords chosen to describe an image are limited in number and scope and have inherent biases. The words chosen to represent an object will be a result of the culture, language and vocabulary of the author. This restricts users to what images they can search and where they can search.

When searching for an image of oneself as a child in a particular room, with a particular toy, wearing a particular outfit, and where certain pieces of furniture are visible, it is unlikely that keywords pertaining to such elements are associated with any of the images. Therefore, in order to perform the search, a number of images are identified and then each image is reviewed by a person to identify the further criteria and select those images that match the criteria. For vast image databases, the above method is prohibitive.

When the occasion arises for new descriptors to be attached to old images in the database or new images to be added, the time consuming task of associating keywords with each image must be undertaken. Once an image is defined by keywords it is undesirable to redefine the image. The static method of using keywords to define an image prohibits any dynamic change of an image's characterization.

In order to attempt to overcome these and other drawbacks in keyword searching, it has been suggested to search pictures using a picture as the search criteria. Using such a system, a search criteria image is analyzed for colour, composition, contours, etc. and the results are compared against results of similar analyses performed on stored images. Images with results similar to those of the search criteria image, within predetermined limits, are selected as results of the search.

Searching 2-dimensional images, wherein the 2 dimensions are the 2 standard spatial dimensions, has drawbacks. A bi-dimensional image does not have scale unless calibration is performed during image acquisition. Occlusion—hiding or obstruction of objects—and auto-occlusion—hiding or obstruction of portions of an object by other portions of the same object—result in the loss of a significant fraction of available information. An object has a position and orientation that are easily varied and difficult to analyze. Entire images are often oriented differently, due to camera skew, complicating analysis. Most geometrical information is lost in capturing a 2-dimensional image. This information is difficult to reconstruct absent quite a few assumptions or known parameters. Imaging in only 2 dimensions is also affected by lighting as light casts shadows that affect the perceived image. Careful colouring of an object renders it larger or shaped differently within a 2-dimensional image. Searching and locating 2-dimensional images may have many applications. Unfortunately, it does not allow for recognition of objects or detection of similar objects within images except with regards to a particular view of the objects.

OBJECT OF THE INVENTION

It is an object of this invention to provide an image-based searching method for 3-dimensional images.

It is a further object of this invention to provide a method of characterizing 3-dimensional images.

In accordance with one aspect of the present invention there is provided a method of creating a characterization set for a 3-dimensional object, the method comprising the steps of: determining a reference frame for the 3-dimensional object that is independent of position and orientation of the 3-dimensional object; generating at least one characteristic of the 3-dimensional object for the characterization set in dependence on the reference frame; and associating the 3-dimensional object with the characterization set and the at least one characteristic.

In accordance with another embodiment of the present invention there is provided a method of searching for objects based on a search criteria object having a characterization set containing a characteristic where the objects being searched are stored in a database, said objects being 3-dimensional objects and having a pre-calculated characterization set including the characteristic from the characterization set of the search object criteria, said method comprising the steps of: calculating a characterization difference between the characteristic of the search criteria object and the corresponding characteristic for each object stored in the database; and outputting a representation of objects from the database where the characterization difference fell within predetermined limits.

In accordance with a further embodiment of the present invention there is provided a method of searching for objects based on a search criteria object having a characterization set containing a characteristic where the objects being searched are stored in a database, said objects being 3-dimensional objects, said method comprising the steps of: generating for each object in the database a characterization set wherein the characterization set includes the characteristic from the characterization set of the search criteria object; calculating a characterization difference between the characteristic of the search criteria object and the corresponding characteristic for each object stored in the database; and outputting a representation of objects from the database where the characterization difference fell within predetermined limits.

In accordance with an additional embodiment of the present invention there is provided a method of searching for objects based on a search criteria object having a characterization set containing a plurality of characteristics where the objects being searched are stored in a database, said objects being 3-dimensional objects and having a characterization set including a subset of the plurality of characteristics from the characterization set of the search criteria object, said method comprising the steps of: providing the search criteria object on which to base the search; generating for the search criteria object the characterization set; providing weight selection means for the selection of weights for each of the plurality of characteristics of the search criteria object; sending the characteristic weight and the characterization set of the search criteria object; and receiving and displaying results of a search based on the characteristics of the search criteria object and the characteristic weight.

In accordance with another embodiment of the present invention there is provided a computer readable medium having stored thereon computer-executable instructions for creating a characterization set for a 3-dimensional object, comprising the steps of: determining a reference frame for the 3-dimensional object that is independent of position and orientation of the object; producing at least one characteristic for the characterization set in dependence on the reference frame; and associating the 3-dimensional object with the characterization set and the at least one characteristic.

In accordance with yet a further embodiment of the present invention there is provided a computer readable medium having stored thereon computer-executable instructions for searching for objects based on a search criteria object having a characterization set containing a characteristic where the objects being searched are stored in a database, said objects being 3-dimensional objects and having a pre-calculated characterization set including the characteristic from the characterization set of the search object criteria, said method comprising the steps of: calculating a characterization difference between the characteristic of the search criteria object and the corresponding characteristic for each object stored in the database; and outputting a representation of objects from the database where the characterization difference fell within predetermined limits.

In accordance with an additional embodiment of the present invention there is provided a computer readable medium having stored thereon computer-executable instructions for searching for objects based on a search criteria object having a characterization set containing a plurality of characteristics where the objects being searched are stored in a database, said objects being 3-dimensional objects and having a characterization set including a subset of the plurality of characteristics from the characterization set of the search criteria object, said method comprising the steps of: providing the search criteria object on which to base the search; generating for the search criteria object the characterization set; providing weight selection means for the selection of weights for each of the plurality of characteristics of the search criteria object; sending the characteristic weight and the characterization set of the search criteria object; and receiving and displaying results of a search based on the characteristics of the search criteria object and the characteristic weight.

BRIEF DESCRIPTION OF THE DRAWINGS

Exemplary embodiments of the invention will now be described in conjunction with the attached drawings, in which.

DETAILED DESCRIPTION

In 3-dimensional imaging, wherein the 3 dimensions refer to the 3 standard spatial dimensions, more information about an object is known (i.e. scale) than with a 2-dimensional image since a model is constructed by integrating many views, constituting a near complete representation of the original object. With control of lighting, true colour of the object can be ascertained at virtually every location on the surface. Consequently, few problems related to occlusion, auto-occlusion, shadowing, scale, or other limitations known to affect 2-dimensional searching arise.

However, not all 3-dimensional images are constructed by integrating views. Some 3-dimensional images are single views captured in 3-dimensions. Such views suffer some of the drawbacks of 2-dimensional imaging, such as auto-occlusion, but not others such as unknown scale. The method according to this invention is described with reference to 3-dimensional images constructed by integrating views. However, the method described herein is also applicable to partial 3-dimensional images and 3-dimensional images wherein only a single view is captured.

When analyzing 2-dimensional images, orientation is significant to the analysis. The orientation of a line horizontally, instead of vertically, makes an image different. Search algorithms for use with two-dimensional images are often executed in dependence upon orientation. One suggested method of achieving true orientation independence is to mathematically transform the image of the object into a rotation independent value and compare this with other rotation independent values. For non-symmetrical objects, this involves calculating a value for each view of the object, where each view is determined in dependence upon an acceptable variation in the rotationally independent value. It can be seen that as the complexity of the object grows so does the number of required values. Once rotation invariance is achieved over a single criterion, other criteria are analyzed in an orientation dependent manner.

Figure 1:
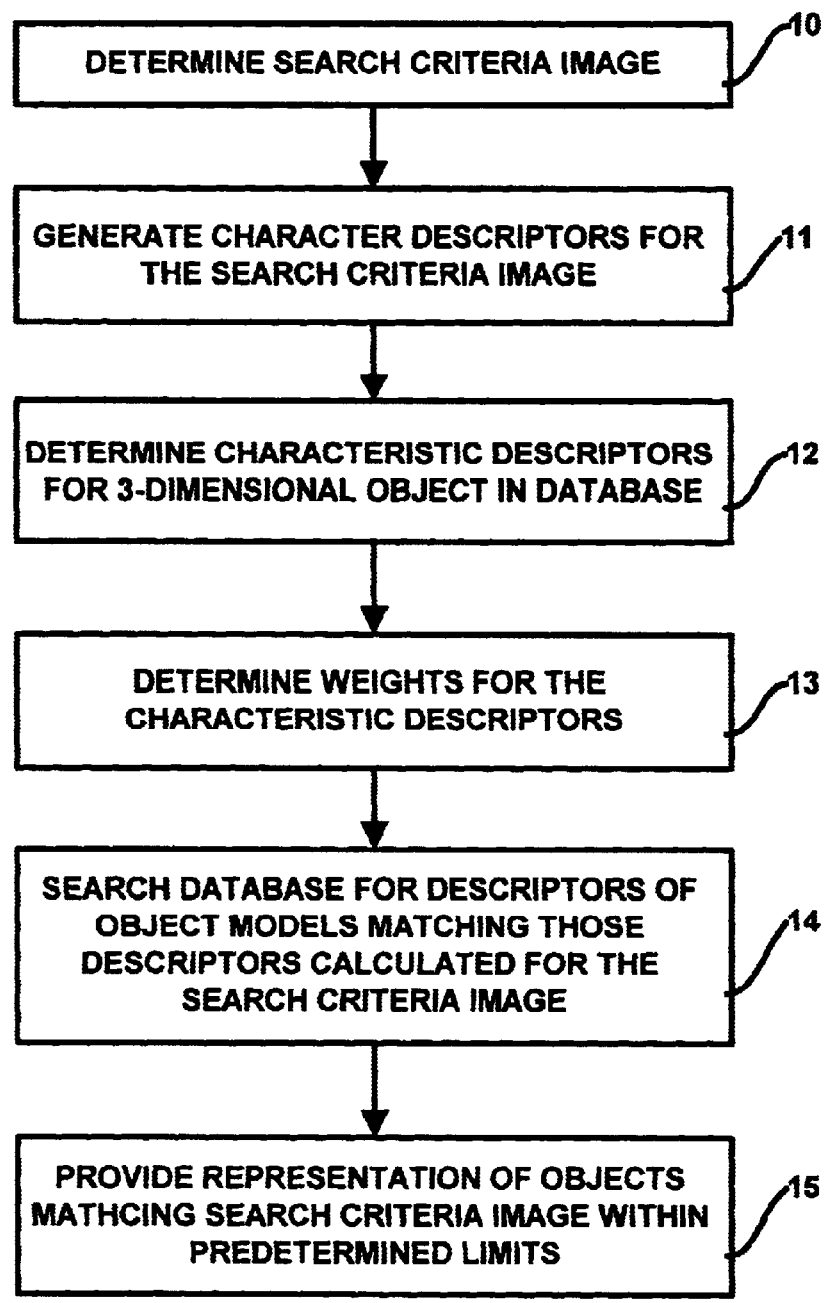
FIG. 1 is a method searching 3-dimensional images using characteristic descriptors according to an embodiment of the present invention.

FIG. 1 shows a method 16 of rapidly searching through a plurality of 3-dimensional object models based on a 3-dimensional search criteria image according to an embodiment of the present invention. The method 16 may be performed in two separate stages: (1) determining characteristic descriptors and (2) searching through an object model database for a match based on these characteristic descriptors. In step 10, a 3-dimensional search criteria image is chosen to form the basis of the search. In order to accomplish searching of a 3-dimensional database, a series of characteristic descriptors is extracted from the search criteria image in step 11 and all 3-dimensional object models in a database in step 12. Preferably, the object models in the database are analyzed to extract characteristic descriptors in advance of searching; however, this calculation may be performed in conjunction with searching.

The characteristic descriptors calculated for the search criteria image and the database images are orientation independent. This provides a consistent basis on which to search through all objects, even those that are different only in orientation.

These descriptors are based on characteristics such as scale, colour and geometry.

A weighting of the importance of the characteristic descriptors can be set prior to searching in step 13. For example, when the model is formed by re-sizing an image of an object, scale is important and is assigned significant weight. When a similar but not identical object is sought, for example as a decorative piece, size and colour receive more weight than geometry. The use of weights is an optional step and when not used, equal weighting is assigned to each of the characteristic descriptors.

When the characteristic descriptors are extracted in advance, these descriptors are searched for those matching the weighted characteristic descriptors determined for the search criteria image in step 14. A combination of some or all of the characteristic descriptors can be used or the search could focus on a single characteristic descriptor. Alternatively, each object model in the database is analyzed in dependence upon the characteristic descriptors and weighting to locate close matches. Another method that includes a combination of the two searches is employed when a coarse search is provided in dependence upon the characteristic descriptors and then, once narrowed, a detailed search comprising further analysis is employed. Searching techniques and hashing algorithms for searching numerical data are known and many such techniques can be applied to various search processing functions of the present invention.

Once some object models are identified having characteristic descriptors that match the weighted characteristic descriptors of the search criteria image within predetermined limits, those models or identifiers thereof are provided to an output device in step 15. Preferably, the object models are ordered in dependence upon rank or closeness of characteristic descriptors to the weighted characteristic descriptors of the search criteria image.

The steps of characteristic descriptor determination (steps 11 and 12), search criteria image selection (step 10) and setting the characteristic descriptor weights (step 13) may be performed in any order prior to searching (step 13).

Figure 3:
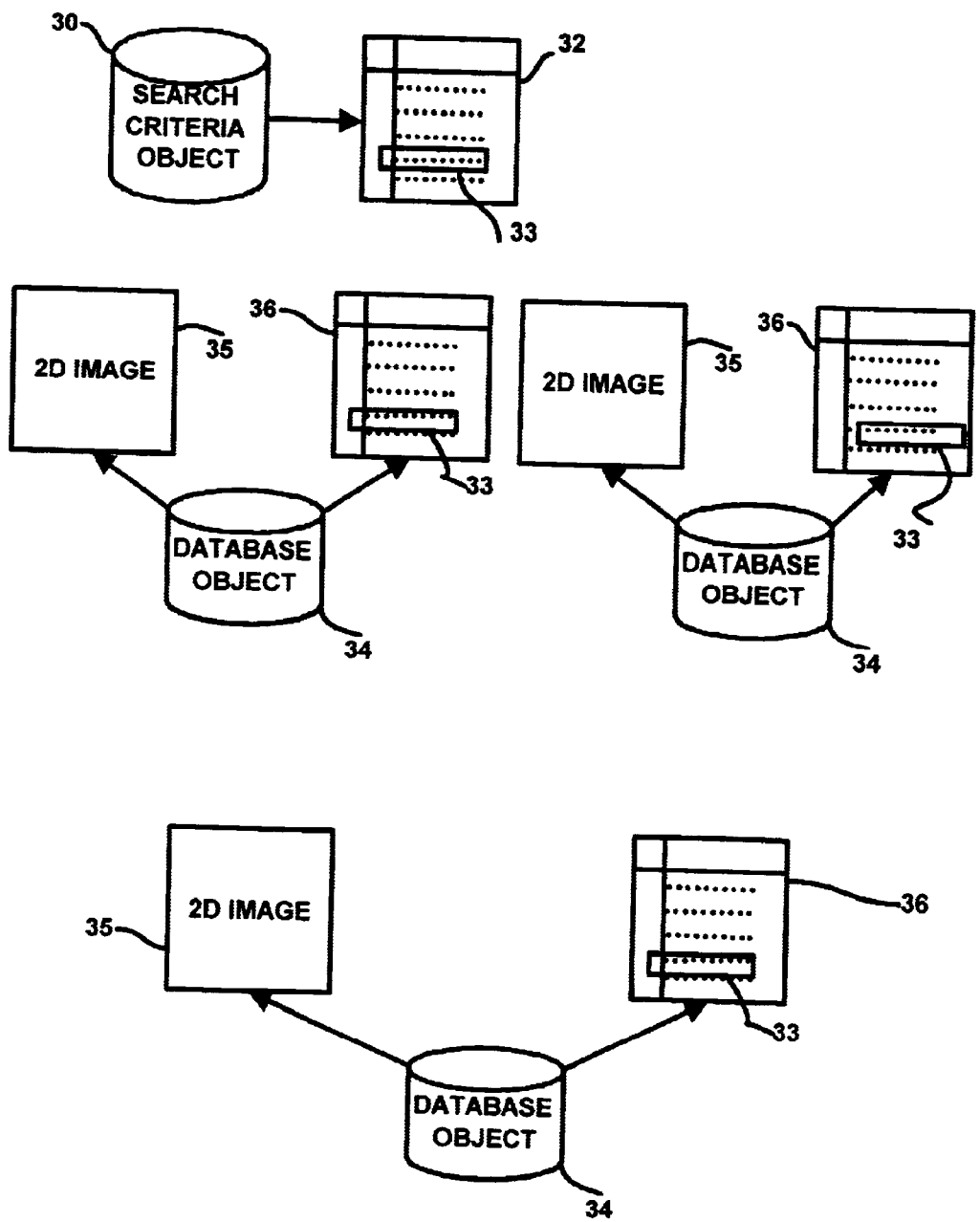
FIG. 3 is a diagram depicting the relationship between a search criteria image and database objects and their respective characterization sets.

FIG. 3 illustrates the relationship between the search criteria image 30 and the objects in the database 34. Searching is performed on the characterization sets 32 and 36 of the search criteria image 30 and the database objects 34, not the objects themselves. Each database object characterization set 36 contains at least one characteristic 33 also contained in the characterization set 32 of the search criteria object 30. When searching has been completed, a 2-dimensional representation of the database objects 35 is shown to the user. By only displaying a 2-dimensional image for each matching object time to display the results can be greatly reduced.

Input Object Models

The input search criteria object 30 is preferably a scanned 3-dimensional image similar to those contained within the database 34. The input search criteria object 30 may be formed by a variety of methods such as scanning or imaging, electronic design, variations of scanned or electronically designed object models, or a combination of models. The search criteria object 30 can be any one of a variety of criteria including: text descriptions as initial criteria, computer designed models, 2-dimensional images, 3-dimensional images input by the user, results from a previous search with or without modifications (i.e. stretching in one direction), morphing together multiple images, a plurality of models to define the acceptable descriptor range, etc.

Characteristic Descriptors

Geometric analysis can be performed at three levels: local, regional and global. Global analysis concerns a whole object or model and is useful in determining a reference frame for use in local and regional calculations. A local feature is a very small portion of an object or model, for example, a normal at a given point. A regional feature varies slowly inside or over a region of the object or model. Other criteria that are applicable at all levels are entropy, complexity, and volume.

Figure 2:
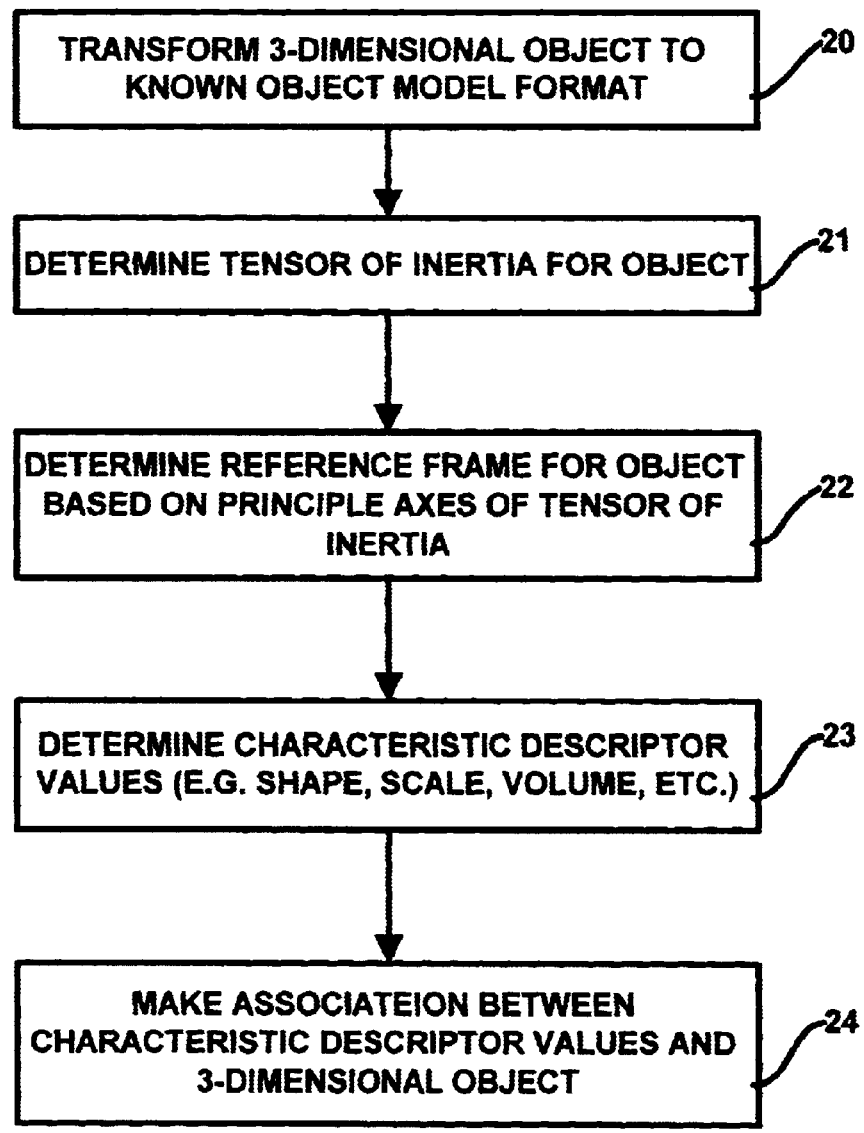
FIG. 2 is a method of creating a characterization set containing at least one characteristic descriptor according to an embodiment of the present invention.

FIG. 2 shows a method 25 of creating a characterization set (for example 32 and 36 in FIG. 3) including at least one characteristic descriptor 33 for a 3-dimensional image according to an embodiment of the present invention. In step 20, the 3-dimensional object or image is transformed into a known object model format. Although all 3-dimensional modeling formats are equally applicable to geometric analysis, the exemplary embodiment described below will consider a triangle format. Other 3-dimensional object model formats include elementary shapes such as cubes, cylinders, and spheres; Bezier surfaces; derivatives of surfaces such as NURBS; clouds of points; quad-meshes; and triangles. Reducing an object model or scanned image to triangles or triangular solids can be performed, for example, by using Open Inventor® or Imageware®-commercially available software packages.

Each triangle in a triangular object model is represented by a point and a weight.

The point is at the centre of mass of the triangle and it is given by $$r = \frac{1}{3}\begin{bmatrix} x_1 + x_2 + x_3 \\ y_1 + y_2 + y_3 \\ z_1 + z_2 + z_3 \end{bmatrix}$$

and the weight is equal to the area of the triangle $$w = \frac{1}{2}\|(r_3 - r_1) \times (r_2 - r_1)\|$$

where the operator x represents an outer product and $$r_q = \frac{1}{3}\begin{bmatrix} x_q \\ y_q \\ z_q \end{bmatrix}$$

In order to calculate characteristic descriptors 33 for each object 30 or 34 that are orientation independent, a reference frame that rotates with the model is required. The reference frame permits the extraction of comparable characteristic descriptors 33 from each reference model within the database 34. One possible such reference frame results from the principle axes of the tensor of inertia of the object model 30 or 34 in step 21. The tensor of inertia is defined as $$I = \begin{bmatrix} I_{xx} & I_{xy} & I_{xz} \\ I_{yx} & I_{yy} & I_{yz} \\ I_{zx} & I_{zy} & I_{zz} \end{bmatrix}$$

where $$I_{qr} = \frac{1}{n}\sum_{i=1}^{n} w_i[(q_i - q_{cm})(r_i - r_{cm})]$$

and where q and r are equal to x, y or z in Cartesian coordinates and $w_i$ is the weight of the $i^{th}$ particle. The tensor is symmetric.

The axes of reference used for future descriptor calculations are the principal axes of the tensor according to step 22 which satisfy the equation $$Ia_i = \lambda_i a_i$$

where $a_i$ is an eigen vector and $\lambda_i$ is the corresponding eigen value. The axes are labeled from one to three, in decreasing order of their eigen values. Once the axes are identified, a direction is required to determine a comparable frame of reference. However, since the tensor of inertia remains unchanged when one of x, y and z is replaced by a corresponding one of −x, −y and −z, the direction of the axes is defined by determining a standard deviation of cord distribution.

A cord is defined as a vector from the centre of mass of an object model to a point on a surface of the object model. The distribution of the cords is a distance between some points and the centre of mass and the angles between the cords and each of two axes. For each axis, points are divided into two groups—for example, "North" and "South" where a point falls within the North group when the angle between the axis and the cord to said point is smaller than 90° and within the South group when the angle is greater than 90°. A standard deviation for length of the cords is calculated for each group associated with a particular axis. When the North group of a given axis has a higher standard deviation, the direction of the corresponding eigen vector is not changed; otherwise, the direction is reversed—flipped by 180°. The outer product between the two axes whose directions have been determined dictates the direction of the third axis as their product and the third axis must have the same direction to ensure an orthogonal system. This reference frame ensures that the descriptor values calculated for each object are comparable.

Figure 4A:
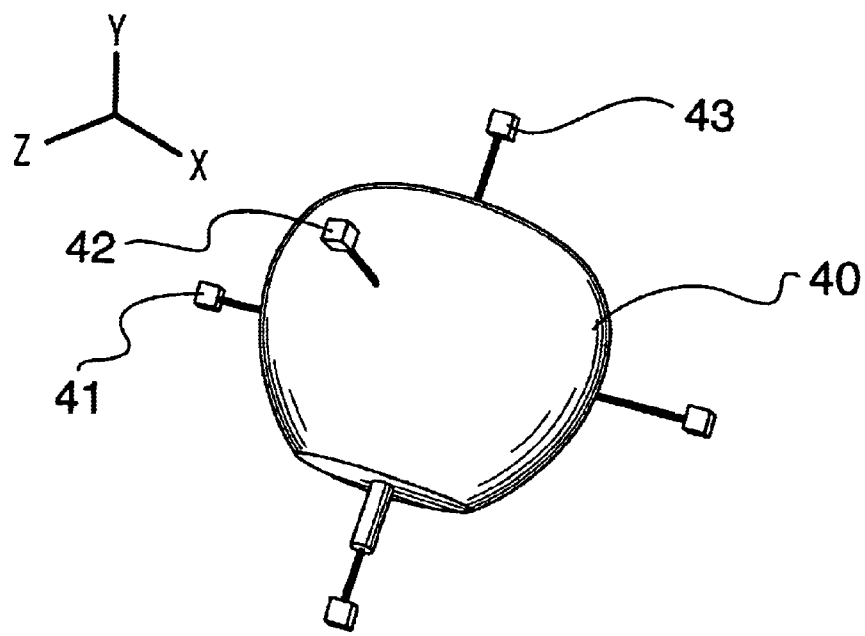
FIG. 4a is an exemplary object showing the reference frame axes of this object.
Figure 4B:
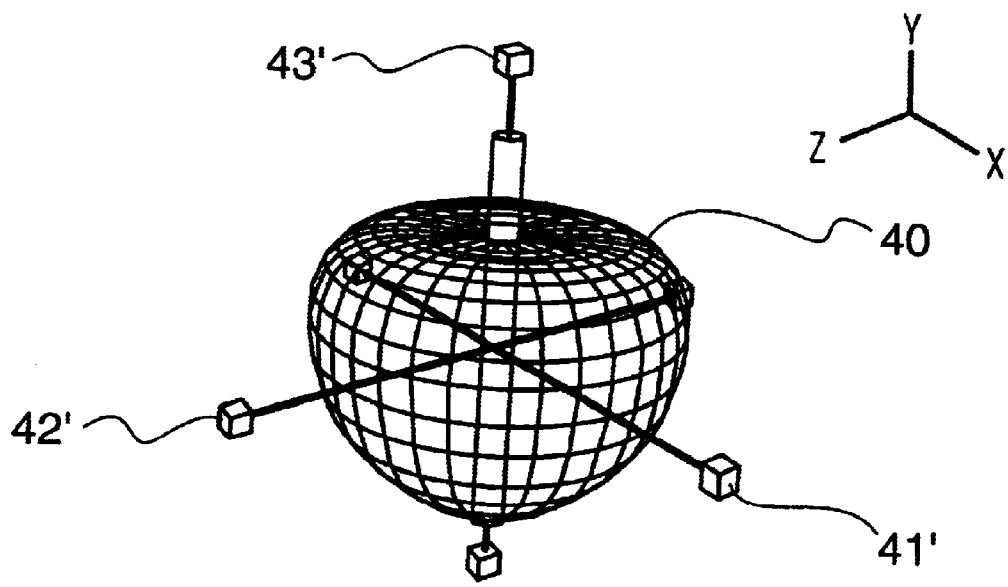
FIG. 4b is a diagram of the same object depicted in FIG. 4a shown in triangular format.

FIG. 4a shows an image of an apple 40 with the reference frame axes 41, 42, 43. The axes 41, 42, 43 are in a rotated position with the apple 40 so that if the axes 41, 42, 43 and the apple 40 were to be rotated to align the axes 41, 42, 43 with the standard x, y, z axes, the apple 40 would also be completely centered with the standard axes x, y, z. FIG. 4b shows the same apple 40 as FIG. 4a but in triangular format with the reference frame axes 41', 42', 43' and the apple 40 centered with respect to the standard axes x, y, z.

Once a comparable reference frame is found individual characteristic descriptors 33 may be calculated in step 23. These characteristic descriptors 33 can be based on shape, scale, volume, colour, texture, etc. Each characteristic descriptor 33 will be discussed in more detail below.

When the characteristic descriptors 33 are determined they are then linked to the original object 30 or 34 in step 24 for use when searching the database based on the search criteria image 30. These characteristic descriptors 33 are grouped together into a characterization set 32 or 36. The reduced size and increased simplicity of the characterization set 32 or 36 make it faster and more efficient to search through the characterization set 32 or 36 in lieu of searching through each object to make a comparison between objects. By replacing the data set of an object with its characterization set 32 or 36, a reduction in size by at least a factor of 10 can be realized with the characterization set having a size of approximately 200 to 500 bytes.

The characterization set 32 or 36 for an object 30 or 34 has the approximate structure as follows, the constituents of which will be described in detail below:

```
Characterization Set {
    Scale {
        Volume
        Radius of Bound Sphere (x,y,z) }
    Color {
        Histogram for Red
        Histogram for Blue
        Histogram for Green }
    Shape {
        Cords {
            Histogram for cord angle with reference axis 1
            Histogram for cord angle with reference axis 2
            Histogram for cord with normal }
        Wavelet {
            Histogram for volume by voxel using wavelets }
        Moments {
            Matrix of moments for object }
    }   }
```

Scale

A simple but useful characteristic descriptor 33 for a query by content search of a plurality of 3-dimensional images is scale. The scale refers to the size or dimensions of a three-dimensional model. By using only the scale of the object model, a plurality of images are rapidly scanned, thereby concentrating the search on object models having dimensions within predetermined limits. One scale determination method is a bounding box, the minimum size box containing an object and aligned with the reference frame. In order to facilitate computations and thereby improve performance, the bounding box is restricted to specific axes. The reference frame axes of the object model work well as they are fixed and rotate with the object model thus there are not a plurality of bounding box sizes for the object when the object is rotated.

While the bounding box method is a useful scale determination tool, it provides no information about mass distribution within. In order to increase the information relating to scale, distribution of mass inside the bounding box may be used. A rough description of the mass distribution is obtained from eigen values of the tensor of inertia. These eigen values correspond to the inertia of the object model about the axes defined by the eigen vectors.

Alternatively, a bounding sphere may be used having a radius equal to half of the longest axis of the object model. Such a sphere requires no orientation considerations and is completely rotationally invariant. As the bounding sphere comprises less information that a bounding box, it is less preferable for use by a search engine. Other solids may also be used in place of a box to determine scale.

Shape

Dividing shape into global, regional and local features allows a search engine to rapidly compare global aspects of shape such as scale, tensors of inertia, and volume for each object model within a database 34. This results in a set of object models meeting the criteria of the global aspects of shape within predetermined limits. As the results will likely only be a small subset of the database, more detailed comparisons can be conducted to locate those object models meeting specified characteristic descriptors 33 at more detailed levels.

One local feature that is used in detailed comparisons is a normal. A normal is defined as a vector perpendicular to a given triangle face and is given by:

$$n = \frac{(r_2 - r_1) \times (r_3 - r_1)}{\|(r_2 - r_1) \times (r_3 - r_1)\|}$$

An angle between each determined normal and each of two axes of the reference frame is determined. Computing an angle between two orthogonal axes and a line obviates the need to compute an angle between the third orthogonal axis and the line, as evidenced from the cosine law. From the determined angles, three different types of histograms can be produced, and one or more is selected for comparison in dependence upon complexity of the object model. The angles between a normal and first and second axes, angles $\alpha_1$ and $\alpha_2$ respectively, are defined as $$\alpha_q = \cos^{-1} \frac{n \cdot a_q}{\|n\| \|q_q\|}$$

where q=1 or 2. The vertical scale of the histograms represents an occurrence of a given angle and the horizontal scale represents scale. The way in which the angles are mapped determines complexity of the description.

The histogram with the lowest complexity is defined as follows: $h(\alpha_q)$ where q is 1 and 2. This is referred to as a histogram of the first type. This histogram does not provide distinction between $\alpha_1$ and $\alpha_2$ and does not account for relations therebetween; it is useful for discriminating very different features. A histogram of the second type has two parts: one for each angle, thereby distinguishing between the two angles but not establishing any relation therebetween. A third histogram is a bi-dimensional histogram defined as follows: $h(\alpha_1, \alpha_2)$ and provides distinction between the angles and maps a relation there between.

Figure 5A:
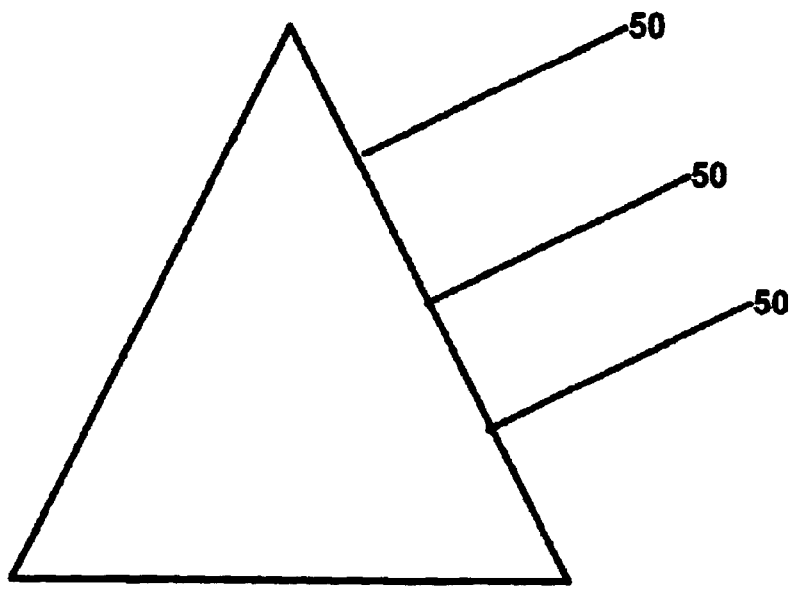
FIG. 5a is a diagram of a profile of a pyramid.
Figure 5B:
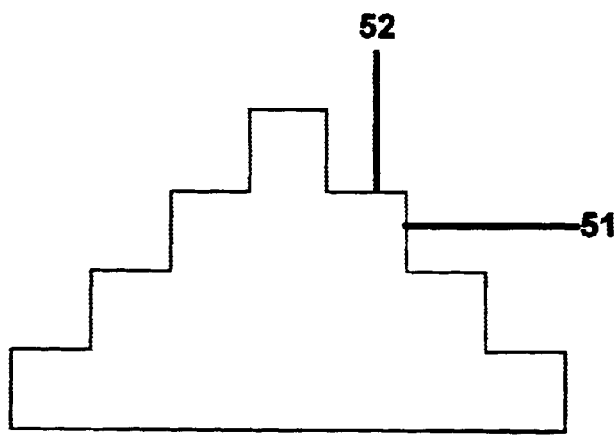
FIG. 5b is a diagram of a profile of a step pyramid.

Normals are sensitive to local variation of shape, which may result in erroneous search results. As an example, FIG. 5a shows a view of a pyramid and FIG. 5b shows a view of a step pyramid. Though shown in two dimensions, the problems highlighted by these shapes are applicable in 3-dimensions as well. A search engine is intended to return one when presented with the other as a search criterion. Within predetermined limits, scale is of a same magnitude for the figures shown or for physical pyramids in Africa and South America. Shape is similar on a global scale with similar tensors resulting. However, when normals are analyzed for local details, significant differences result.

Referring to FIG. 5a, the normals 50 along an entire surface of the pyramid are parallel. The normals for the step pyramid of FIG. 5b are in two different orientations shown by lines 51 and 52 corresponding to the orientations of the steps. The histograms corresponding to these pyramids are distinct. In order to overcome this problem, regional features are analyzed. For example, by also analyzing cords having lengths and orientations a region is defined over which the cords vary in a substantially deterministic fashion. The result of regional analyses allows for a coarse comparison resulting in close correlation between pyramids and step pyramids.

Referring to the above example, the cord orientation changes slowly on a given region while the normal orientation has significant variations. For normals, the statistical distribution of orientations is represented by three histograms representing angles whereas a cord has an angle and a length where the horizontal scale of a histogram represents length of the cord. The histogram can be scale dependent or scale independent when scale is normalized. Scale independence provides the additional flexibility of weighting scale as unimportant and performing a search independent of scale related information.

Volume

Though defining an object model as surfaces containing an object is how objects are visually appreciated, it is not necessarily the best or only method of analyzing an object model. A 3-dimensional object model defines a volume. In a 3-dimensional discrete representation, building blocks are referred to as voxels, a short hand for volume elements. A voxel, like a pixel, represents a discrete point; however, a voxel has three dimensions. Using a voxel a 3-dimensional model is binarised losing a small amount of information. The object model's co-ordinates are mapped to discrete voxel co-ordinates $$\begin{bmatrix} x \\ y \\ z \end{bmatrix} \Rightarrow \begin{bmatrix} i\Delta_x \\ j\Delta_y \\ k\Delta_z \end{bmatrix}$$

where the $\Delta$'s are dimensions of a voxel and i, j and k are discrete co-ordinates. When the density of points in an object model is insufficient, interpolation of the model is necessary to generate more points and to obtain a better description in voxel space. It is preferable to use known interpolation methods to interpolate an original object model in order to minimize any discrepancy between a "standard" representation and a voxel representation.

One possible method for analyzing a voxel representation is by using a wavelet transform that performs similar to the human eye. As human eyes and brains are already capable of matching 3-dimensional objects very effectively, the algorithm for matching 3-dimensional object models described herein attempts to mimic the human system.

The wavelet transform results in a multi-scale analysis. Multi-scale as used herein refers to analyzing an object model at different levels of detail. A fast transform implementation of the wavelet transform allows rapid calculation and thereby increases efficiency. The fast wavelet transform is an orthogonal transformation having an orthogonal base. The elements of the base are characterized by scale and position. Each element of the base is bounded in space and occupies a well defined region. The analysis performed with the wavelet transform is local and the size of the analyzed region is dependent upon a scale of the wavelet. A one-dimensional wavelet is defined as $$\sqrt{2^j} w(2^j q - n)_{n,j \in Z}$$

For the present embodiment, Daubechies' DAU4 wavelets having two vanishing moments are used. An NxN matrix corresponding to a one dimensional transform is formed, where N is a multiple of 2. Elements in the matrix are defined as positive and negative values of $C_0$, $C_1$, $C_2$, and $C_3$ where these are defined as follows:

$$C_0 = \frac{1 + \sqrt{3}}{4\sqrt{2}}, \quad C_1 = \frac{3 + \sqrt{3}}{4\sqrt{2}}, \quad C_2 = \frac{1 - \sqrt{3}}{4\sqrt{2}}, \quad C_3 = \frac{11\sqrt{3}}{4\sqrt{2}}$$

The matrix is implemented as a quadrature mirror filter defined as follows:

$H \therefore [C_0, C_1, C_3]$ $G \therefore [C_3, -C_2, C_1, -C_0]$

H is a smoothing filter while G is a filter with two vanishing moments. The one dimensional wavelet transform is computed by applying the wavelet transform matrix hierarchically, first on the full vector of length N, then on the N/2 values smoothed by H, then on the N/4 values smoothed again by H until two components remain. In order to compute the wavelet transform in 3-dimensions, the array is transformed sequentially on a first dimension for all values of its other dimensions, then the array is transformed sequentially on its second dimension and, then the array is transformed sequentially on its third dimension. Alternatively, the transforms are performed in parallel or in another order. The result of the wavelet transform is an array having a same dimension as the initial voxel array.

A set of wavelet coefficients represents a significant amount of information. A logarithm in base 2 of the coefficients is calculated in order to enhance the coefficients corresponding to small details which usually have a very low value when compared to other coefficients. A total signal for each level of detail is determined by integrating a signal inside a corresponding box. A histogram representing the distribution of the signal at different levels of detail is then constructed: the vertical scale relates to a total amount of signal at a given level of detail and the horizontal scale relates to level of detail. Each indication of level of detail is determined in dependence upon three level of detail factors—one for each axis.

Colour and Texture

Both colour and shadows affect the colour viewed and our appreciation of space. This renders 2-dimensional images difficult to search in light of true shape or colour. Unfortunately, when imaging in 3-dimensions and gathering true colour information, often, an object can not be displayed as it appeared without some physical texture related information. Small cracks, bumps and other patterns on a surface of an object result in shadows and lighting variations that affect appearance. As an example, a polished flat metal surface appears reflective. Add to that surface a fine textured granularity, and the surface appears as a non-reflective metal surface. Therefore, colour is often analyzed in conjunction with material properties and other appearance related information.

Colour criteria is often defined through numerical representations of colours. These representations are known. Common representations include RGB (red-green-blue) and HSV (hue-saturation-value). RGB colour representation is an orthogonal mapping of the red, green and blue colour components. HSV colour representation is a cylindrical mapping of the red, green and blue colour components.

Colour is modeled either in dependence upon geometry or independent of geometry. Both techniques alone or in combination are equally applicable. Colour distribution and geometry are often considered as two totally distinct entities. This is an overly simplistic view as colour is carried by a physical object and has co-ordinates on that object; colours are linked to geometric information of an object. Nevertheless it is extremely convenient when one is not interested in positions of the colours on a surface of an object to ignore any correlations between colour and geometry.

Colour is modeled as a reaction of an object to its lighting environment. For example, in computer vision, colour is described as a set of coefficients: diffuse colour, specular colour, and specularity to name a few. The diffuse colour is related to Lambertian behaviour of the object while the specular colour is a rough approximation of directional reflection. The specularity is related to shininess of the object. The use of coefficients allows for description of an appearance of a given material.

For searching, a user determines whether an object made of gold, bronze or another substance is desired and enters the determination as a search criteria. A search of images is then directed to include the colour criteria as a search parameter. As colour information is unique in a 3-dimensional image— in contrast to a 2-dimensional image—a search criteria of this type is easily and effectively applied.

Colour criteria information can be characterized as a parameter within geometrical information. This results from an extension to a wavelet analysis of 3-dimensional images, which is described in detail in E Paquet, "Recognition of Polychromatic Range Images based on Chromatic Sampling of Scalar Products and Logarithmic Histograms", accepted in the International Journal of Optoelectronics (1996), hereby incorporated by reference. A model is mapped onto a discrete six-dimensional grid—xyzRGB. A wavelet transform is computed and a multi-resolution statistic is presented in the form of a histogram. As colour is a unique criteria, the model colour is known and is combined with a texture description to obtain a "physical" colour description.

One of the most widely used lighting models in computer graphics is the Phong model. This model has shown itself to be quite effective in describing almost any kind of material with a set of seven coefficients: three for diffuse colour, three for specular colour and one for reflectivity. By computing the values of these coefficients, it is possible to describe a colour criteria distribution for the model. The Phong model is generally defined as $$I \approx I_s[r_d s \; n + r_s (rv)^f]$$

where $$r = \frac{-s + 2(s.n)n}{\|-s + 2(s.n)n\|}$$

n is a unit normal at a given point, s is a unit vector from the same point to a light source, v is a vector in the direction of an observer, r is a unit vector indicating a direction of reflected light when material of a surface has perfect reflectivity, f is a measure of specularity for the surface, $I_s$ is a light source intensity, $r_d$ is diffuse reflectivity—often referred to as diffuse colour—and $r_s$ is specular reflectivity. The diffuse reflectivity is a Lambertian part of reflected light while the specular reflectivity depends on direction of observation. There are diffuse and specular reflectivity coefficients for red, blue and green components of the light. Such a lighting model is a rough approximation of true lighting; nevertheless, the model effectively represents different types of materials. It is thus possible to identify a given material M by a set of seven coefficients $$M \therefore [R_d \; G_d \; B_d \; R_s \; G_s \; B_s \; f]$$

where R, G and B represent red, green and blue. All these coefficients can be defined over an interval [0,1]. When the model is formed of one material, these coefficients constitute an acceptable definition of the material M; however, when the model is formed of a plurality of different materials, the materials' statistic is represented by a set of seven histograms.

$$M \therefore [h(R_d) \; h(G_d) \; h(B_d) \; h(R_s) \; h(G_s) \; h(B_s) \; h(f)]$$

The histograms—for an object or model comprising a single material—are then available for comparison by a search engine to analyze and locate histograms associated with similar 3-dimensional images.

Alternatively, color criteria distribution can be considered as separate from geometrical information. The colour criteria results from an analysis of a colour histogram for the red, green and blue distribution. This is discussed in H S Sawhney and J L Hafner, "Efficient Colour Histogram Indexing", IEEE International Conference on Image Processing, pp. 66–70 (1994) which is hereby incorporated by reference.

When location of colour is unimportant, the description of a colour distribution is straightforward. A colour histogram is computed for red, green and blue. The vertical scale of these histograms corresponds to an occurrence of a given colour while the horizontal scale represents normalized intensity of the colour. The only complexity that is introduced is that of shading. For decorative purposes and colour matching, it is often best to determine a shaded colour appearance. Alternatively for other applications, "true" colour is preferable. Therefore, in determining red, green, and blue components of colour, a decision is made regarding application of shading.

When the location of the colour is important, a wavelet approach is generalized to apply to colour wherein, for example, a six dimensional model is used; the dimensions are x, y, z, R, C, and B. First, the model is binarised

[x y z R G B]=[i$\Delta_x$ j$\Delta_y$ k$\Delta_z$ l$\Delta_R$ m$\Delta_G$ n$\Delta_B$]

A six-dimensional wavelet transform is performed. An array is transformed sequentially on a first dimension for all values of its other dimensions, then on a second dimension, up to a sixth dimension.

The logarithm base 2 of the wavelet coefficient is computed and the total signal at each level of detail is determined by integrating the corresponding signal. A statistical distribution of the signal is produced in the form of a histogram. The horizontal scale of the histogram relates to level of detail and the vertical scale relates to a corresponding signal. Of note is that "scale" of the histograms is provided by combining levels of detail from each of the xyzRGB spaces.

A texture mapping technique applies a texture map to a rough geometrical description of an object. Since the map substantially describes a colour distribution, overlaying the colours in accordance with the texture produces the same image as a colour image stored with higher geometrical resolution. A low geometrical resolution allows for manipulation of an image or navigation through an image with less processing time than high geometrical resolutions. A texture map is usually a low resolution RGB mapping. Sometimes, texture is applied as a pattern that repeats itself on the object. The pattern constitutes the colour information or, alternatively, the pattern modulates an RGB distribution. The texture and the RGB distribution are analyzed separately or as a whole by computing a modulated colour distribution.

With the recent developments in the art of texture mapping, texture is achieving some prominence. Most often, texture is analyzed according to one of two models: as a pattern that is mapped on an object or as a complete colour description of the object. Often, texture is modeled as an intensity—RGB or RGBA (alpha: transparency)—image. Texture can also be modeled using a bi-dimensional orthogonal system. Co-ordinates, S and T, are normalized. When the object model has a material description (M), the diffuse colour of the model is modulated by the texture $$\begin{bmatrix} R_{out} \\ G_{out} \\ B_{out} \end{bmatrix} = \begin{bmatrix} R_d R_{tex} \\ G_d G_{tex} \\ B_d B_{tex} \end{bmatrix}$$

and separate analysis of the texture is unnecessary. When texture is the sole colour descriptor for an object model, a statistical description of colour distribution of the texture is formed by histograms of red, green and blue distribution. The material and the texture are a twofold manifestation of colour distribution. When both material and texture are available, preferably, an analysis is performed in dependence upon both. The distribution of colour information between material analysis and texture analysis is somewhat arbitrary, and division of the colour information is unlikely to be performed uniformly from one object model to another. This means that a given colour distribution has many texture-material manifestations. When analyzed separately, two colour distributions that are similar may result in different textures and materials. For use in a search engine, this presents added complexity. Alternatively, analysis is performed independently of texture and then independently of material resulting in the aforementioned shortcomings.

Search Engine

To increase search result accuracy and provide flexibility, a weighted combination of the aforementioned descriptors is used for searching. This allows any number of the characteristic descriptors 33 to any degree of importance to be used during the searching as a weight of 0 excludes the descriptor 33 from the calculation. In this manner it is possible to search based on a single characteristic descriptor 33 or more than one. Weightings are commonly applied to errors or to correlations. Errors and correlations are not necessarily equivalent when weighted. Referring to the first, a simple error weighting takes each weighting multiplied by the associated error, for example error in scale times scale weighting factor, and sums or averages them. Resulting error values are compared to limits to determine if the error is acceptable. When acceptable, an object model is located, otherwise it is passed over. A problem with this approach is that sensitivity of scale, shape and colour algorithms may vary. Thus, the characteristic descriptor having a highest sensitivity dominates other characteristic descriptors. Of course a scaling factor for error determination to compensate for sensitivity variation is possible, but may involve complex equations as sensitivity often varies in a non linear fashion.

When rank is used instead of error, classification is made separately for the scale, shape and colour and then rankings are grouped and weighted to determine a final ranking of object models. This eliminates relative sensitivity of the algorithms at the cost of some information. For example, a top ranked object model may be inappropriate. Using an error determination allows filtering of all inappropriate object models.

Errors are computed by comparing two sets of histograms. Since the number of channels in each histogram is often low -typically in the order of thirty two—the error is computed as follows:

$$err = \sqrt{\sum_{i=1}^{n} [h_{input}(i) - h_{ref}(i)]^2}$$

So, for an object model compared against itself, no error results. It is possible to correlate error values across criteria by modifying the search criteria object model in predetermined ways to determine a scale factor for each error weighting as applied to the specific search criteria. The error weightings are applied to corresponding error values in order to normalize the error values resulting in less sensitivity variations. Another, alternative is to have a series of predetermined object models for calibrating the error results in dependence upon error results from the object models and for determining a scale in dependence thereon.

All objects falling within an acceptable deviation of the search criteria image result from the search and are output to a visual display. Instead of displaying the characterization set of an object or the entire object itself, a 2-dimensional thumbnail image of each object can be displayed.

Exemplary System Configuration

Figure 6:
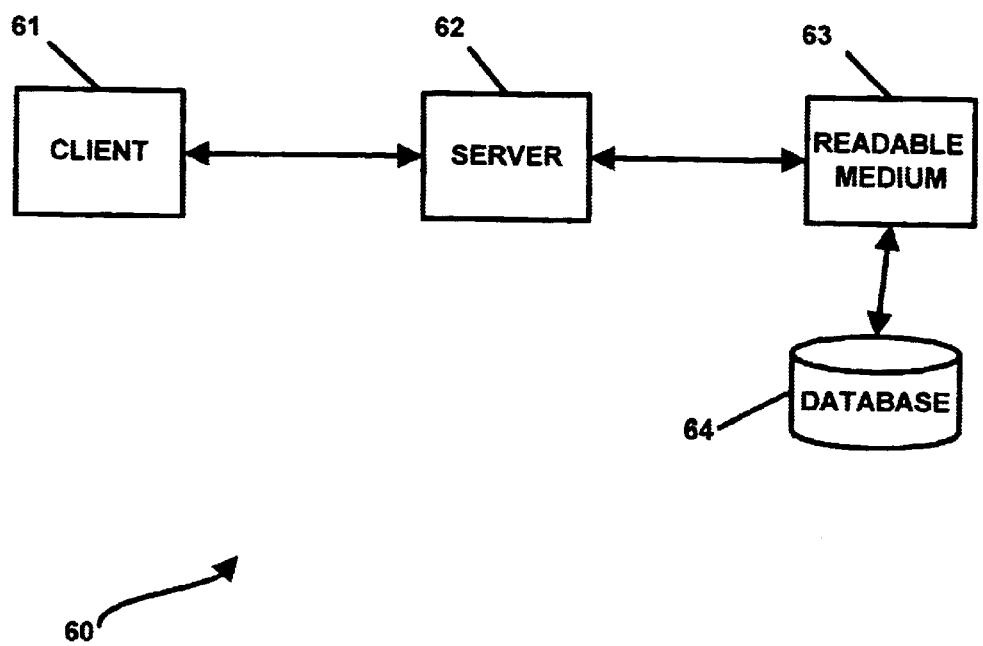
FIG. 6 is a system diagram showing an exemplary system configuration of a system for searching 3-dimensional images in a database.

FIG. 6 shows an exemplary configuration of a system 60 for searching 3-dimensional images in a database 64. A client 61 acts as the interface between the entire system and a user. Through the client 61 the user selects a search criteria object and specific characteristics on which to base a search. The server 62 accepts input from the client 61 and uses methods stored on the readable medium 63 to perform searching of the images in the database 64. The methods on the readable medium 63 may be methods such as those shown in FIGS. 1 and 2 for creating a characterization set for an image and searching through images for a match based on the characterization sets of the images being searched.

Numerous other embodiments may be envisaged without departing from the spirit and scope of the invention.

What is claimed is:

1. A method of searching 3-dimensional models in a database, each 3-dimensional model represented by a 2-dimensional depiction, said method comprising:
   (a) obtaining a 3-dimensional search criteria model represented by a 2-dimensional depiction;
   (b) determining characteristic descriptors for each of the 3-dimensional models in the database and the 3-dimensional search criteria model, comprising:
      (bi) determining an orientation independent reference frame for each model;
      (bii) generating surface characteristic descriptors for each model on the basis of the orientation independent reference frame, the surface characteristic descriptors describing visible surface properties of each model;
      (biii) generating physical characteristic descriptors for each model on the basis of the orientation independent reference frame, the physical characteristic descriptors describing physical properties of each model;
   (c) determining differences between the surface and physical characteristic descriptors of the 3-dimensional search criteria model and the surface and physical characteristic descriptors of each of the 3-dimensional models in the database;
   (d) defining a variance range for the differences; and
   (e) providing the 2-dimensional depiction of the 3-dimensional models from the database for which the differences are within the variance range.

2. The method according to claim 1 wherein the step of obtaining the 3-dimensional search criteria model includes:
   providing a plurality of randomly selected 3-dimensional models from the database for selection of the 3-dimensional search criteria model.

3. The method according to claim 1 wherein the step of obtaining the 3-dimensional search criteria model includes:
   receiving a user provided 3-dimensional model for the 3-dimensional search criteria model.

4. The method according to claim 1 wherein the step of obtaining the 3-dimensional search criteria model includes:
   receiving indication of selection of a 3-dimensional model provided for which the difference is within the variance range from a previous search for the 3-dimensional search criteria model.

5. The method according to claim 1 wherein the step of obtaining the 3-dimensional search criteria model includes:
   aggregating a plurality of 3-dimensional models to form the 3-dimensional search criteria model.

6. The method according to claim 1 wherein the step of determining the difference includes:
   receiving a selected weight for each of surface and physical characteristic descriptors;
   determining an individual difference between each of the surface and physical characteristic descriptors for the search criteria model and each of the surface and physical characteristic descriptors for each of the 3-dimensional models in the database; and
   calculating a weighted sum difference for each of the 3-dimensional models in the database based on the selected weights and the individual differences to form the differences for each of the 3-dimensional models in the database.

7. The method according to claim 1 wherein the step of determining an orientation independent reference frame includes:
   determining the tensor of inertia for each model;
   determining eignvalues and eigenvectors of the tensor of inertia;
   orienting each eigenvector according to the mass distribution of each model along each eigenvector; and
   using the oriented eignevectors as the axes for the orientation independent reference frame.

8. The method according to claim 1 wherein at least one of the surface and physical characteristic descriptors for each model is a global characteristic descriptor describing the model as a whole.

9. A computer readable medium having stored therein computer-executable instructions for searching 3-dimensional models in a database, each 3-dimensional model being represented by a 2-dimensional depiction, said computer executable instructions comprising:
   (a) obtaining a 3-dimensional search criteria model represented by a 2-dimensional depiction;
   (b) determining characteristic descriptors for each of the 3-dimensional models in the database and the 3-dimensional search criteria model, comprising:
      (bi) determining an orientation independent reference frame for each model;
      (bii) generating surface characteristic descriptors for each model on the basis of the orientation independent reference frame, the surface characteristic descriptors describing visible surface properties of each model;
      (biii) generating physical characteristic descriptors for each model on the basis of the orientation independent reference frame, the physical characteristic descriptors describing physical properties of each model;
   (c) determining differences between the surface and physical characteristic descriptors of the 3-dimensional search criteria model and the surface and physical characteristic descriptors of each of the 3-dimensional models in the database;
   (d) defining a variance range for the differences; and
   (e) providing the 2-dimensional depiction of the 3-dimensional models from the database for which the differences are within the variance range.

10. The computer-executable instructions according to claim 9, wherein the step of obtaining the 3-dimensional search criteria model includes:
   providing a plurality of randomly selected 3-dimensional models from the database for selection of the 3-dimensional search criteria model.

11. The computer-executable instructions according to claim 9 wherein the step of obtaining the 3-dimensional search criteria model includes:
receiving a user provided 3-dimensional model for the 3-dimensional search criteria model.

12. The computer-executable instructions according to claim 9 wherein the step of obtaining the 3-dimensional search criteria model includes:
receiving indication of selection of a 3-dimensional model provided for which the difference is within the variance range from a previous search for the 3-dimensional search criteria model.

13. The computer-executable instructions according to claim 9 wherein the step of obtaining the 3-dimensional search criteria model includes:
aggregating a plurality of 3-dimensional models to form the 3-dimensional search criteria model.

14. The computer-executable instructions according to claim 9 wherein the step of determining the difference includes:
receiving a selected weight for each of surface and physical characteristic descriptors;
determining an individual difference between each of the surface and physical characteristic descriptors for the search criteria model and each of the surface and physical characteristic descriptors for each of the 3-dimensional models in the database; and
calculating a weighted sum difference for each of the 3-dimensional models in the database based on the selected weights and the individual differences to form the differences for each of the 3-dimensional models in the database.

15. The computer-executable instructions according to claim 9 wherein the step of determining a plurality of characteristic descriptors includes:
determining the tensor of inertia for each model;
determining eignvalues and eigenvectors of the tensor of inertia;
orienting each eigenvector according to the mass distribution of each model along each eigenvector; and
using the oriented eignevectors as the axes for the orientation independent reference frame.

16. The computer-executable instructions according to claim 9 wherein at least one of the surface and physical characteristic descriptors for each model is a global characteristic descriptor describing the model as a whole.

* * * * *